Jan. 27, 1931. J. HILDEBRANT 1,790,583
DIRECTION SIGNAL FOR MOTOR VEHICLES
Filed Feb. 2, 1926 2 Sheets-Sheet 1
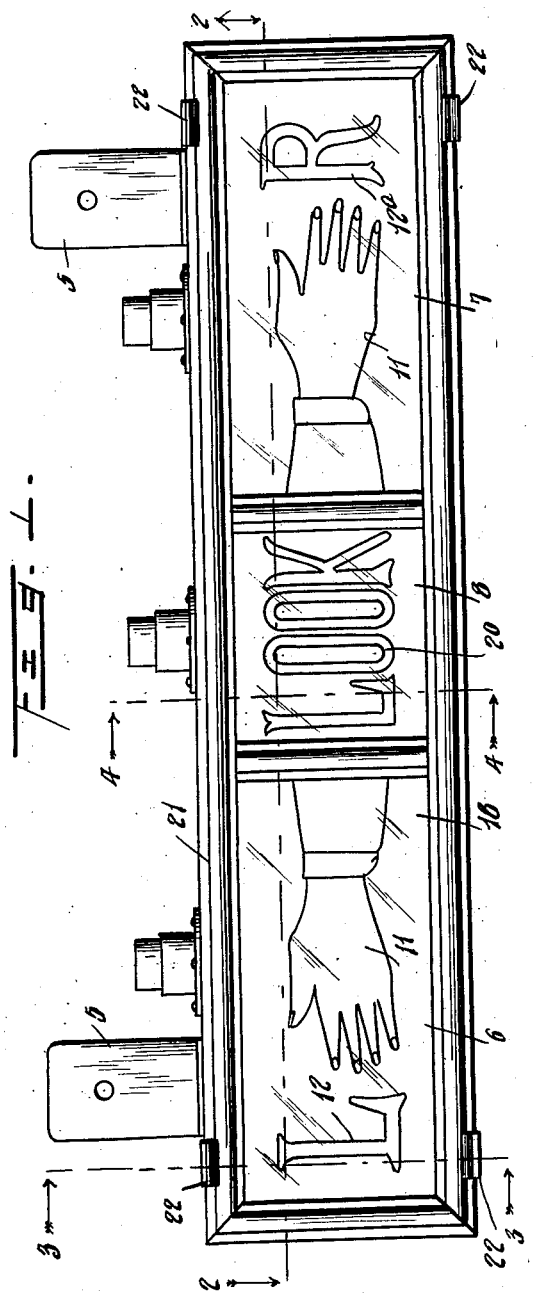
Inventor
J. Hildebrant.
By Bryant & Lowry
Attorneys Jan. 27, 1931. J. HILDEBRANT 1,790,583
DIRECTION SIGNAL FOR MOTOR VEHICLES
Filed Feb. 2, 1926 2 Sheets-Sheet 2
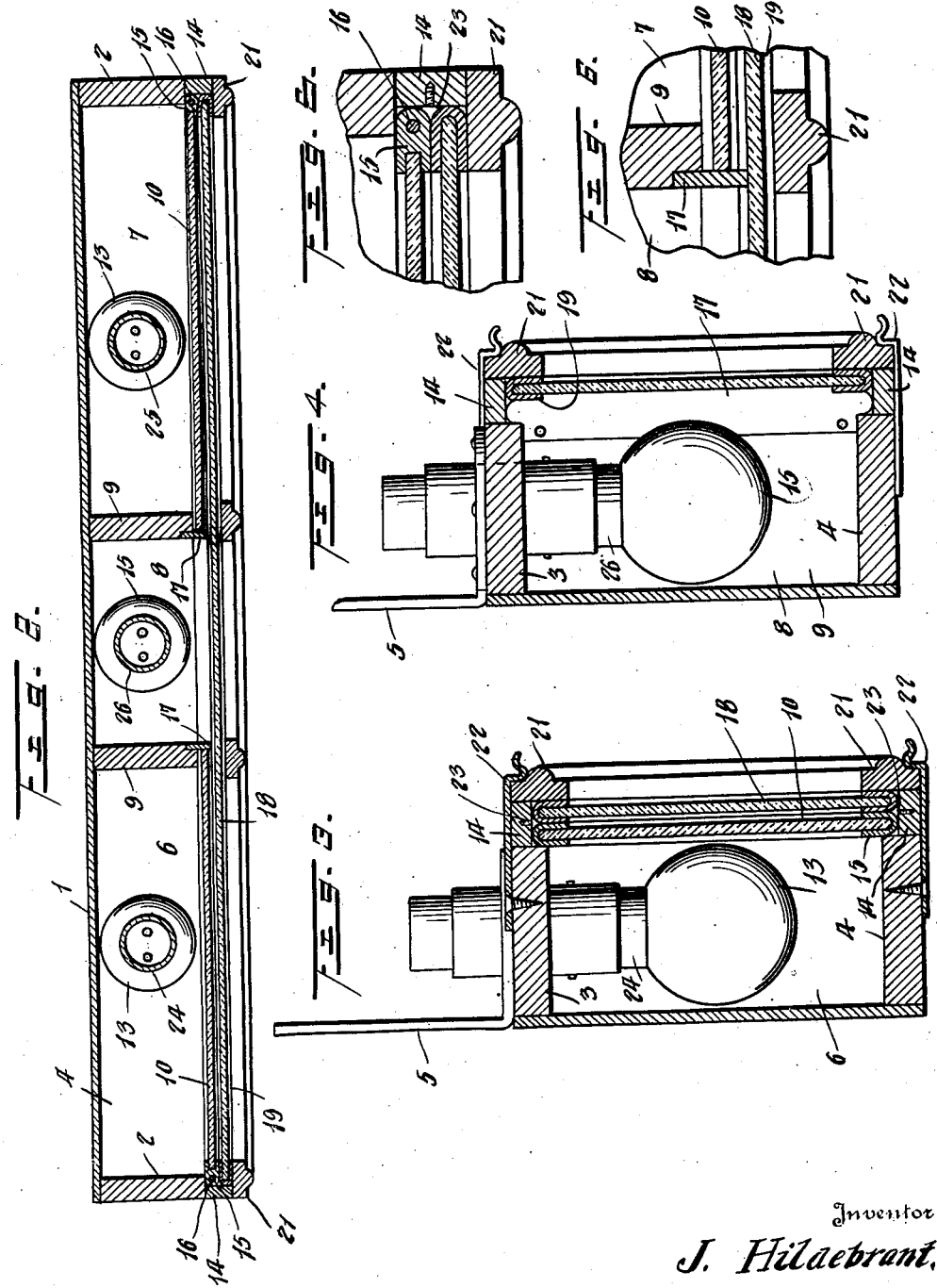
Inventor
J. Hildebrant,
By
Attorneys Patented Jan. 27, 1931

1,790,583

UNITED STATES PATENT OFFICE

JOZEF HILDEBRANT, OF MANVILLE, NEW JERSEY

DIRECTION SIGNAL FOR MOTOR VEHICLES

Application filed February 2, 1926. Serial No. 85,594.

This invention relates to certain new and useful improvements in direction signals for motor vehicles and has for one of its objects to provide a signal casing to be carried at the front and rear ends of the motor vehicle, with illuminating means therein for indicating a proposed change in direction of travel, such as either turning to the right or left with a further signal of an illuminating character for attracting attention to the signal casing.

A further object of the invention is to provide a direction signal for motor vehicles wherein a casing is divided into three separate light compartments that are horizontally alined, the end compartments carrying direction indicators, while the middle compartment carries a sign for attracting attention to the signal casing, the middle compartment being illuminated selectively with either of the end compartments.

With the above and other objects in view that will become apparent as the nature of the invention is better understood, the same consists of the novel form, combination and arrangement of parts hereinafter more fully described, shown in the accompanying drawings and claimed.

In the drawings, wherein like reference characters indicate corresponding parts throughout the several views, Figure 1 is a front elevational view of a direction signal casing constructed in accordance with the present invention, Figure 2 is a longitudinal horizontal sectional view taken on line 2—2 of Fig. 1 showing the three horizontally alined light compartments, Figure 3 is a vertical cross-sectional view taken on line 3—3 of Fig. 1 through one of the end compartments, Figure 4 is a vertical cross-sectional view taken on line 4—4 of Fig. 1 through the middle compartment, Figure 5 is a detail sectional view of a portion of an outer end of the signal casing showing the manner of mounting the signal plate in the casing, Figure 6 is a detail sectional view showing one of the partition walls for the casing and the inner end of one of the end signal plates.

A direction signal casing is mounted on the front and rear ends of a motor vehicle, the casing embodying a rear wall 1, end walls 2 and top and bottom walls 3 and 4 respectively. The casing is supported upon the motor vehicle by the hanger brackets 5 that are preferably secured to the upper wall 3 thereof as shown in Figs. 1, 3 and 4. As shown in Fig. 2, the casing is divided into end compartments 6 and 7, and an intermediate compartment 8 by the provision of the vertical partition walls 9.

The open side of the casing opposite the compartments 6 and 7 is provided with a pair of indicia carrying plates 10 bearing hand characters 11 and the letters "L" and "R" designated by the numerals 12 and 12a to indicate proposed changes in the direction of travel of the motor vehicle. The plate 10 is formed of glass so that light from the bulb 13 carried by the upper wall 3 of the casing will shine therethrough to illuminate the same. The support for the plate 10 includes a facing strip 14 attached to the edge of the open side of the casing, the plate being enclosed at its upper and outer edges by a U-shaped binding strip 15, the outer side of the binding strip 15 being supported on the hinged pin 16 as clearly shown in detail in Fig. 5. The plate 10 being disposed between the facing strips 14, the free swinging edge thereof moves into abutting relation with the stop strip 17 carried by the outer edge of the partition wall 9.

A glass cover plate 18 enclosed at its edges by a U-shaped binding strip 19 is placed in flat engagement with the binding strip 15 upon the glass plates 10 and is preferably of a translucent nature, that portion of the glass cover 18 overlying the middle compartment 8 having painted or otherwise impressed thereon letters 20 forming the word "Look."

To retain the glass plate 18 in position at the open side of the casing, there is provided a frame 21 embodying bars mating with the edges of the open side of the casing and also the outer edges of the vertical partition wall 9 as shown in Figs. 1 and 2, the frame 21 being retained in position by the spring clips 22 carried by the upper and lower sides of the top and bottom walls 3 and 4 of the casing. To eliminate relative movement of the plates 10 and 18, wedge screws 23 are carried by the inner face of the facing strip 14 with the the wedge heads thereof extending between adjacent portions of the U-shaped binding strips 15 and 19 as clearly shown in Figs. 3 and 5.

Lamp sockets 24, 25, and 26 are carried by the upper wall 3 of the compartments 6, 7, and 8 in which the lamp bulbs 13 are mounted and a suitable source of electrical energy is in communication with the lamps in the sockets for selective illumination thereof.

From the above detail descriptions of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

What is claimed is:—

A direction signal for motor vehicles comprising an elongated rectangular casing divided into alined central and end compartments by spaced partitions and equipped with separate means of illumination, a separate glass plate for each end compartment, a binding strip on the upper, lower and outer end edges of said plate, a vertical pivot for the outer end of the plate, extending through the binding strip, an outer plate having an edge binding strip and extending over the entire open side of the casing outwardly of the aforesaid end plates with the binding strips of all plates in abutting relation, anti-rattling wedges on the casing extending between adjacent binding strips, a removable frame for retaining the outer plate in position, and means for fastening the frame against the outer plate for causing the several plates to be held in binding relation, the end plates carrying direction indicia and indicia on the outer plate facing the central compartment.

In testimony whereof I affix my signature.

JOZEF HILDEBRANT.